US012745177B2

(12) United States Patent
Wang et al.

(10) Patent No.: US 12,745,177 B2
(45) Date of Patent: Sep. 22, 2026

(54) PAGING MONITORING METHOD AND APPARATUS, COMMUNICATIONS DEVICE, STORAGE MEDIUM, AND SYSTEM

(71) Applicant: VIVO MOBILE COMMUNICATION CO., LTD., Dongguan (CN)

(72) Inventors: Yangyang Wang, Dongguan (CN); Yitao Mo, Dongguan (CN); Xuanbing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 293 days.

(21) Appl. No.: 18/417,070

(22) Filed: Jan. 19, 2024

(65) Prior Publication Data

US 2024/0214934 A1 Jun. 27, 2024

Related U.S. Application Data

(63) Continuation of application No. PCT/CN2022/106816, filed on Jul. 20, 2022.

(30) Foreign Application Priority Data

Jul. 22, 2021 (CN) ......................... 202110831777.2

(51) Int. Cl.
*H04W 52/02* (2009.01)
*H04W 24/00* (2009.01)

(52) U.S. Cl.
CPC ........ *H04W 52/0235* (2013.01); *H04W 24/00* (2013.01)

(58) Field of Classification Search
CPC . H04W 52/00; H04W 52/02; H04W 52/0209; H04W 52/0225; H04W 52/0229; H04W 52/02304; H04W 24/00; H04W 52/0212; H04W 52/04; H04W 68/00; H04W 68/02; H04L 43/00; H04L 1/0041
See application file for complete search history.

(56) References Cited

U.S. PATENT DOCUMENTS

2019/0349856 A1* 11/2019 Liu .................. H04W 52/0219
2020/0092814 A1* 3/2020 Zhou ................ H04W 52/0235
(Continued)

FOREIGN PATENT DOCUMENTS

CN 102932883 A 2/2013
CN 111132280 A 5/2020
(Continued)

OTHER PUBLICATIONS

CATT, “Details of PEI configuration”, 3GPP TSG RAN WG1 #105-e, e-Meeting, May 19-27, 2021, R1-2104534.
(Continued)

*Primary Examiner* — Warner Wong
(74) *Attorney, Agent, or Firm* — The Webb Law Firm

(57) ABSTRACT

A paging monitoring method includes a UE obtains target configuration information. The target configuration information includes at least one of the following a correspondence between a power saving signal and a PO, a first cycle, or target resource information, and the target resource information is used to indicate a resource used for the power saving signal; and the UE monitors the power saving signal based on the target configuration information.

20 Claims, 9 Drawing Sheets

(56) References Cited

U.S. PATENT DOCUMENTS

2020/0396687 A1 12/2020 Hwang et al.
2021/0007050 A1* 1/2021 Lin ........................ H04W 76/28
2021/0014825 A1* 1/2021 Shi .................... H04W 52/0229
2021/0051584 A1* 2/2021 Cheng ............... H04W 52/0235
2021/0144638 A1* 5/2021 Liao ...................... H04W 76/28
2022/0015034 A1* 1/2022 Miao ..................... H04W 72/23
2022/0110057 A1* 4/2022 Wang ................ H04W 52/0235
2022/0124625 A1* 4/2022 Fu ....................... H04W 68/005
2022/0182942 A1* 6/2022 Guo .................. H04W 52/0235
2022/0312316 A1* 9/2022 Lo ......................... H04L 1/1812
2022/0368444 A1* 11/2022 Hu ........................ H04J 3/0658
2022/0377670 A1* 11/2022 Xue .................. H04W 52/0216
2022/0394616 A1* 12/2022 Maleki .............. H04W 52/0216
2023/0007589 A1* 1/2023 Lin ................... H04W 72/0446
2023/0097949 A1* 3/2023 He .................... H04W 52/0235 370/318
2023/0104198 A1* 4/2023 Maleki .................. H04L 5/0053 370/329
2023/0131118 A1* 4/2023 Kim .................. H04W 52/0216 370/311
2023/0370967 A1* 11/2023 He ...................... H04W 68/005
2024/0147372 A1* 5/2024 Wang ................ H04W 52/0235
2024/0188042 A1* 6/2024 Mohammad Soleymani .............. H04W 76/28
2025/0071683 A1* 2/2025 Li ..................... H04W 52/0216

FOREIGN PATENT DOCUMENTS

CN 112956256 B 12/2022
EP 4017132 A1 6/2022
WO 2021027427 A1 2/2021

OTHER PUBLICATIONS

ZTE et al., “Discussion on power saving enhancements for paging”, 3GPP TSG RAN WG1 #105-e, e-Meeting, May 10-27, 2021, R1-2104221.

* cited by examiner

PAGING MONITORING METHOD AND APPARATUS, COMMUNICATIONS DEVICE, STORAGE MEDIUM, AND SYSTEM

CROSS-REFERENCE TO RELATED APPLICATIONS

This application is a Bypass Continuation application of International Patent Application No. PCT/CN2022/106816, filed Jul. 20, 2022, and claims priority to Chinese Patent Application No. 202110831777.2, filed Jul. 22, 2021, the disclosures of which are hereby incorporated by reference in their entireties.

BACKGROUND OF THE INVENTION

Field of the Invention

This application relates to the field of communication technologies, and in particular to a paging monitoring method and apparatus, a communication device, a storage medium, and a system.

Description of Related Art

To reduce power consumption, a paging process based on a wake-up signal (WUS) is introduced. To increase an energy saving gain, a paging process based on a group wake-up signal is introduced. To reduce a load of a paging early indication (PEI), one power saving signal (for example, WUS) may be associated with a plurality of paging occasions (PO). However, when one power saving signal is corresponding to the plurality of POs, excessively much information needs to be carried in the power saving signal, causing an excessively great load, thereby affecting a detection effect of the power saving signal. In addition, a PO that is relatively far away needs to wake up in advance for an excessively long time, and a PO that is relatively close does not need to wake up in advance for an excessively long time, so that power saving effects of different UEs in a cell are unequal. Therefore, how the user equipment (UE) reduces the load of the power saving signal and how to monitor the power saving signal is a problem to be solved urgently.

SUMMARY OF THE INVENTION

Embodiments of this application provide a paging monitoring method and apparatus, a communication device, a storage medium, and a system.

According to a first aspect, a paging monitoring method is provided. The paging monitoring method includes: a UE obtains target configuration information, where the target configuration information includes at least one of the following: a correspondence between a power saving signal and a PO, a first cycle, or target resource information, and the target resource information is used to indicate a resource used for the power saving signal; and the UE monitors the power saving signal based on the target configuration information.

According to a second aspect, a paging monitoring method is provided. The paging monitoring method includes: A network side device sends target configuration information to a UE, and the target configuration information is used for the UE to monitor a power saving signal. The target configuration information includes at least one of the following: a correspondence between a power saving signal and a PO, a first cycle, or target resource information, and the target resource information is used to indicate a resource used for the power saving signal.

According to a third aspect, a paging monitoring apparatus is provided. The paging monitoring apparatus includes: an obtaining module and a monitoring module. The obtaining module is configured to obtain target configuration information. The target configuration information includes at least one of the following: a correspondence between a power saving signal and a PO, a first cycle, or target resource information. The target resource information is used to indicate a resource used for the power saving signal. The monitoring module is configured to monitor the power saving signal based on the target configuration information obtained by the obtaining module.

According to a fourth aspect, a paging monitoring apparatus is provided. The paging monitoring apparatus includes a sending module. The sending module is configured to send target configuration information to a UE. The target configuration information is used for the UE to monitor a power saving signal. The target configuration information includes at least one of the following: a correspondence between a power saving signal and a PO, a first cycle, or target resource information. The target resource information is used to indicate a resource used for the power saving signal.

According to a fifth aspect, a UE is provided. The UE includes a processor, a memory, and a program or instructions that are stored in the memory and executable on the processor. When the program or the instructions are executed by the processor, steps of the method in the first aspect are implemented.

According to a sixth aspect, a network side device is provided, where the network side device includes a processor, a memory, and a program or instructions that are stored in the memory and executable on the processor. When the program or the instructions are executed by the processor, steps of the method according to the second aspect are implemented.

According to a seventh aspect, a UE is provided, including a processor and a communication interface. The processor is configured to: obtain target configuration information. The target configuration information includes at least one of the following: a correspondence between a power saving signal and a PO, a first cycle, or target resource information, and the target resource information is used to indicate a resource used for the power saving signal; and monitor the power saving signal based on the target configuration information.

According to an eighth aspect, a network side device is provided, including a processor and a communication interface. The communication interface is configured to send target configuration information to a UE, and the target configuration information is used by the UE to monitor a power saving signal. The target configuration information includes at least one of the following: a correspondence between a power saving signal and a PO, a first cycle, or target resource information. The target resource information is used to indicate a resource used for the power saving signal.

According to a ninth aspect, a non-transitory readable storage medium is provided. The non-transitory readable storage medium stores a program or instructions, and when the program or the instructions are executed by a processor, steps of the method according to the first aspect or steps of the method according to the second aspect are implemented.

According to a tenth aspect, a chip is provided. The chip includes a processor and a communication interface and the communication interface is coupled to the processor. The processor is configured to run a program or instructions, to implement the method according to the first aspect or the method according to the second aspect.

According to an eleventh aspect, a computer program/computer program product is provided. The computer program/computer program product is stored in a non-transitory storage medium. The program/program product is executed by at least one processor to implement steps of the paging monitoring method according to the first aspect, or steps of the paging monitoring method according to the second aspect.

BRIEF DESCRIPTION OF THE DRAWINGS

FIG. 2 is a first schematic diagram of a paging monitoring method according to an embodiment of this application;

FIG. 3 is a first schematic diagram of an example of a correspondence between a power saving signal and a PO according to an embodiment of this application;

DESCRIPTION OF THE INVENTION

The following clearly describes the technical solutions in embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such way are interchangeable in a proper circumstance, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that, the technologies described in the embodiments of this application are not limited to a Long Term Evolution (LTE)/LTE-Advanced (LTE-A) system, and can also be used in other wireless communication systems such as code division multiple access (CDMA), time division multiple access (TDMA), frequency division multiple access (FDMA), orthogonal frequency division multiple access (OFDMA), single-carrier frequency-division multiple access (SC-FDMA), and another system. The terms "system" and "network" in the embodiments of this application may be used interchangeably. The technologies described can be applied to both the systems and the radio technologies mentioned above as well as to other systems and radio technologies. A New Radio (NR) system is described below as an example, and the term NR is used in most of the descriptions, but these technologies can also be used in an application other than an application of the NR system, for example, a 6-th generation (6G) communication system.

Figure 1:
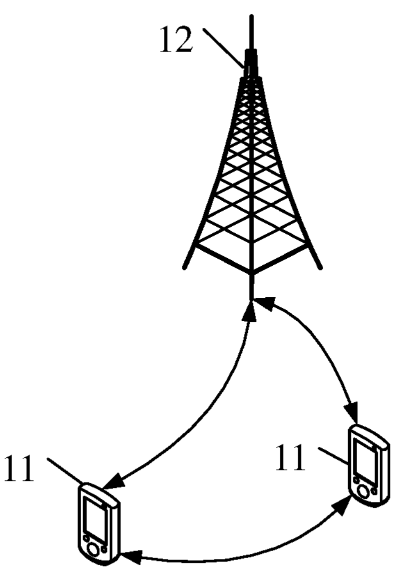
FIG. 1 is a schematic diagram of an architecture of a communication system according to an embodiment of this application.

FIG. 1 is a block diagram of a wireless communication system to which embodiments of this application can be applied. The wireless communication system includes UE 11 and a network side device 12. UE 11 may also be referred to as a terminal device or terminal. UE 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a smart watch, a bracelet, a headset, glasses, and the like. It should be noted that a specific type of UE 11 is not limited in the embodiments of this application. The network side device 12 may be a base station or a core network. The base station may be referred to as an a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

The following explains and describes some concepts and/or terms related to a paging monitoring method and apparatus, a communication device, a storage medium, and a system according to embodiments of this application.

1. Wake-Up Signal and Group Wake-Up Signal

To save power consumption, a paging process based on a wake-up signal (WUS) is introduced. To increase an energy saving gain, a paging process based on a group wake-up signal is introduced.

Paging based on the wake-up signal/group wake-up signal is only applicable to a cell in which a UE is in a radio resource control (RRC) idle state (namely, RRC_IDLE state) triggered in the following process:

The UE receives an RRC early data complete message;

the UE receives an RRC connection release message, and the RRC connection release message does not include a no last cell update message; or the UE receives an RRC connection release message that includes the no last cell update, and the UE uses the WUS before an RRC connection attempt.

If the UE in the RRC_IDLE state supports the wake-up signal, and configuration for the wake-up signal is provided in system information, the UE monitors the WUS based on a WUS parameter provided in the system information. In each discontinuous reception (DRX) cycle, if the UE detects the WUS before a PO, the UE detects a subsequent PO. If the UE does not detect the WUS before the PO, the UE does not implement a subsequent PO detection process.

When the UE uses DRX configuration in the idle state, a correspondence between the WUS and the PO is 1:1, that is, there is one WUS before each PO. When an extended DRX is used and the UE detects the WUS, the UE detects a plurality of subsequent POs. The number of the POs is configured by using a parameter numPOs, where the number may be 1, 2, 4, or the like, by the time when the UE receives a paging message that includes a NAS identifier of the UE, and stops detecting paging based on an early message.

To save power, all UEs that share a same PO are grouped based on a paging probability and/or a UE_ID, UEs in different groups detect different group wake-up signals (GWUS), and UEs in a same group in a same PO detect a same group wake-up signal. If the UE has a capability of detecting the group wake-up signal and the system information of the cell in which the UE resides provides configuration information of the group wake-up signal, the UE first monitors, before detecting paging, a group wake-up signal corresponding to a group in which the UE is located. If the UE obtains the GWUS by monitoring before the PO, the UE detects a subsequent PO. If the UE does not detect the GWUS before the PO, the UE does not implement a subsequent PO detection process.

2. Power Saving Signal in NR

The power saving signal (for example, the WUS/DCI with CRC scrambled by PS-RNTI (DCI with CRC scrambled by PS-RNTI, DCP)/paging early indication (PEI)) is introduced in the NR to achieve an energy saving effect. Currently, a core network may be used to group the UEs, and groups of the UEs in a registration area of the UEs are the same.

To reduce a load of the PEI, that a PEI is associated with a plurality of POs is proposed currently. The plurality of POs are a plurality of POs observed from the perspective of a network side and are used for different UEs.

With reference to the accompanying drawings, a paging monitoring method provided in an embodiment of this application is described in detail by using an embodiment and an application scenario for the paging monitoring method.

When one power saving signal is corresponding to a plurality of POs, considering that a maximum of eight subgroups are supported in one PO, excessively much information needs to be carried in the power saving signal, causing an excessively great load, thereby affecting a power saving signal detection effect. In addition, when one power saving signal is corresponding to the plurality of POs, a PO that is relatively far away needs to wake up in advance for an excessively long time, and a PO that is relatively close does not need to wake up in advance for an excessively long time, so that power saving effects for different UEs in a cell are also unequal. In addition, when one power saving signal is corresponding to the plurality of POs, there is currently no method that determines a reference point, so that a detection resource of the power saving signal cannot be determined. To resolve the foregoing problem, in the paging monitoring method provided in this application, the UE may monitor the power saving signal based on the configuration information (including a correspondence between a power saving signal and a PO, a cycle, and/or resource information), so that detection performance of the PEI is ensured when a load of the power saving signal is reduced as much as possible, and power saving effects of UEs in the cell are relatively equal.

An embodiment of this application provides a paging monitoring method. FIG. 2 shows a flowchart of the paging monitoring method according to an embodiment of this application. As shown in FIG. 2, the paging monitoring method provided in this embodiment of this application may include the following step 201 and step 202.

Step 201: A UE obtains target configuration information.

In this embodiment of this application, the target configuration information includes at least one of the following: a correspondence between a power saving signal and a paging occasion PO, a first cycle, or target resource information. The target resource information is used to indicate a resource used for the power saving signal.

It should be noted that the first cycle may be understood as one observation cycle, and an index of a PO increases from 0 in the first cycle. The number of correspondences between the power saving signals and the paging occasion POs may be divisible by the first cycle, that is, the number of POs corresponding to all power saving signals may be divisible by the total number of all POs monitored by all UEs in the first cycle.

Optionally, in this embodiment of this application, the first cycle is any one of the following: one SFN cycle and one preset time period.

Optionally, in this embodiment of this application, the first cycle includes at least one of the following: a start point, an end point, or duration.

Optionally, in this embodiment of this application, the UE supports the power saving signal and that one power saving signal is corresponding to a plurality of POs.

Optionally, in this embodiment of this application, the correspondence between the power saving signal and the PO is that one power saving signal is corresponding to M POs, and M is an integer greater than or equal to 1.

Optionally, in this embodiment of this application, that one power saving signal is corresponding to M POs includes any one of the following: One power saving signal is corresponding to all subgroups in M POs, one power saving signal is corresponding to one subgroup in M POs, and one power saving signal is corresponding to N subgroups in M POs, where N is the number of subgroups (num_subgroups) corresponding to the power saving signal, and N is an integer greater than or equal to 1.

It should be noted that in this embodiment of this application, the PEI may be used to represent the power saving signal, and PEI-Config represents configuration information of the power saving signal.

Solution 1: One Power Saving Signal is Corresponding to all Subgroups in N POs.

The PEI is corresponding to all subgroups in N POs. For example, as shown in FIG. 3, one PEI is corresponding to four POs, and there are four subgroups in each PO, respectively represented by subgroup-ID=0 (represented by a subgroup ID=0 in the accompanying drawing), subgroup-ID=1 (represented by a subgroup ID=1 in the accompanying drawing), subgroup-ID=2 (represented by subgroup ID=2 in the accompanying drawing), and subgroup-ID=3 (represented by a subgroup ID=3 in the accompanying drawing), the PET may indicate paging in the 4*4=16 subgroups, and UE in one PO is divided into four groups.

Solution 2: One Power Saving Signal is Corresponding to One Subgroup in N POs.

One PEI is corresponding to one subgroup in a plurality of POs, that is, one PEI is set for each subgroup, and the number of POs corresponding to different subgroups may be the same or different.

Figure 4:
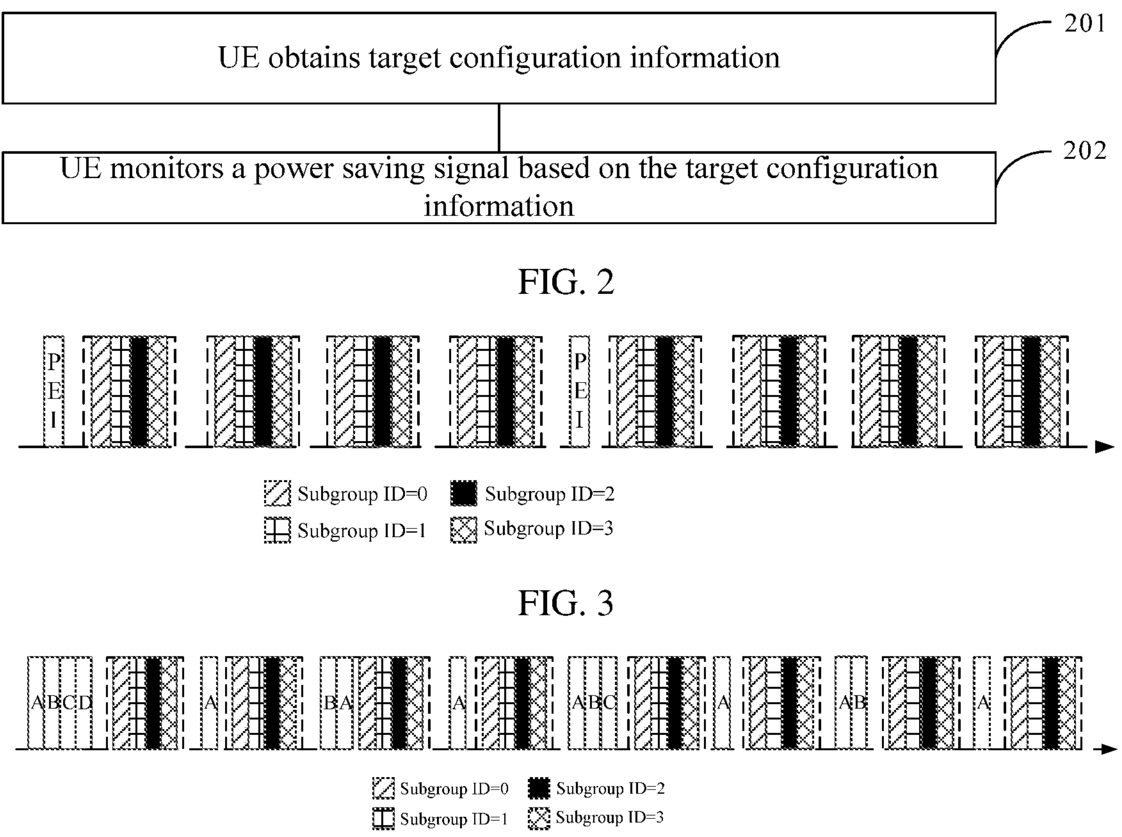
FIG. 4 is a second schematic diagram of an example of a correspondence between a power saving signal and a PO according to an embodiment of this application.

For example, as shown in FIG. 4, there are four subgroups in each PO, and the number (numPOs-persubgroup) of POs corresponding to power saving signals monitored by each subgroup is {1, 2, 4, 8}. A PEI related to a first subgroup is corresponding to one PO. A PEI related to a second subgroup is corresponding to two POs. A PEI related to a third subgroup is corresponding to four POs. A PEI related to a fourth subgroup is corresponding to eight POs. Time domain resources occupied by different PEIs in the figure are different, but resources actually occupied by PEIs may be the same or different. A in FIG. 4 is corresponding to a PEI for subgroup-ID=0, and one PEI is corresponding to one PO. B in FIG. 4 is corresponding to a PEI for subgroup-ID=1, and one PEI is corresponding to two POs. C in FIG. 4 is corresponding to a PEI for subgroup-ID=2, and one PEI is corresponding to four POs. D in FIG. 4 is corresponding to a PEI for subgroup-ID=3, and one PEI is corresponding to eight POs.

Solution 3: One Power Saving Signal is Corresponding to M Subgroups in N POs.

All subgroups in all POs are divided into maxPEI-POmappings mapping groups, and each mapping group is corresponding to POs of the same or different number.

For example, there are eight subgroups in each PO, and the subgroup IDs are respectively {0, 1, 2, 3, 4, 5, 6, 7}. {0, 2, 4, 6} are combined into a mapping group A; and {1, 3, 5, 7} are combined into a mapping group B, and the numPOs-persubgroup is {12, 4}. A PEI related to the group A is corresponding to 12 POs, and a PEI related to the group B is corresponding to four subgroups.

The mapping groups are allocated based on but not limited to the following: sensitivity of each subgroup to power consumption, random subgrouping, a paging probability for each subgroup, a delay requirement for each subgroup, and mobility of each subgroup.

A manner in which a mapping group identifier is transmitted to the UE includes but is not limited to the following.

A related rule is specified in a protocol, for example, during random subgrouping, it is assumed that configuration information of the power saving signal is provided to N groups, and it is specified in a protocol that a mapping group ID in which a subgroup in a PO is located is mapping-ID=subgroup-ID mod N. mapping-ID is a mapping group identifier; and subgroup-ID is a subgroup identifier in a PO monitored by the UE.

A manner of dedicated signaling implication. For example, when a network groups the UEs by using dedicated signaling, the network notifies the UEs of sensitivity to power consumption of a group in which the UEs are located, for example, 0 indicates no sensitivity, 1 indicates slight sensitivity, 2 indicates extreme sensitivity, and information about the numPOs-persubgroup is {12, 8, 4}, the UEs determine, based on the sensitivity to power consumption of the UEs, mapping group identifiers corresponding to the UEs.

Broadcast signaling indication. For example, other information (a relationship between a mapping group and a subgroup, and the number (subgroups-mappinggroups) of POs corresponding to a power saving signal monitored by each mapping group) is carried in a system information block (SIB). Content of the other information is a list, a length of the list is equal to the number (maxPEI-Pomappings) of mapping groups, each list carries a subgroup corresponding to each mapping group, for example, the subgroups-mappinggroups are {{0, 2, 3}, {1, 5, 4}, {6, 7}}, and numPOs-persubgroup is {12, 8, 4}. A PEI corresponding to the {0, 2, 3} subgroup is corresponding to 12 POs, that is, the {0, 2, 3} subgroup in 12 consecutive POs after the PEI needs to detect the PEI. A PEI corresponding to the {1, 5, 4} subgroup is corresponding to eight POs. A PEI corresponding to the {6, 7} subgroup is corresponding to four POs.

In this embodiment of this application, a mapping relationship between the PEI and the PO is directly included in the configuration information of the power saving signal, but is not limited to a presentation manner presented in this embodiment, or the mapping relationship may be included in another parameter in the configuration information of the power saving signal.

Figure 5:
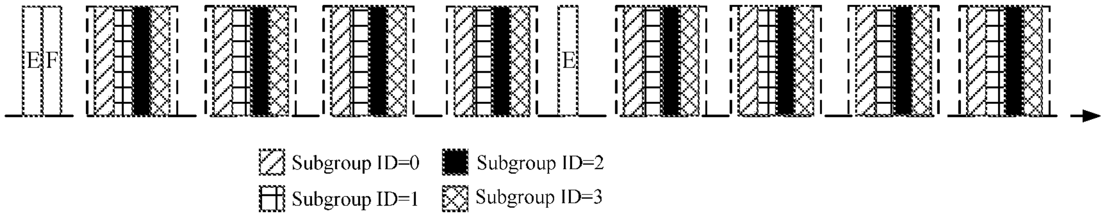
FIG. 5 is a third schematic diagram of an example of a correspondence between a power saving signal and a PO according to an embodiment of this application.

For example, as shown in FIG. 5, there are four subgroups in each PO, and subgroup IDs are respectively {0, 1, 2, 3}. {0, 2} are combined into a mapping group A; {1,3} are combined into a mapping group B; and numPOs-persubgroup is {4, 8}. A PEI related to the group A is corresponding to four POs, and a PEI related to the group B is corresponding to eight subgroups. Time domain resources occupied by different PEIs in the figure are different, but resources actually occupied by PEIs may be the same or different. E in FIG. 5 is corresponding to PEIs of subgroup-ID=0 and 2, and one PEI is corresponding to four POs. F in FIG. 5 corresponds to a PEI of subgroup-ID=3, and one PEI is corresponding to eight POs.

Optionally, in an embodiment of this application, the target resource information includes at least one of the following: time domain resource information of the power saving signal or frequency domain resource information of the power saving signal.

Optionally, in this embodiment of this application, the foregoing target configuration information may be specified in a protocol, may be predefined, may be preset, may be independently determined by the UE, or may be set by the network side device.

Figure 6:
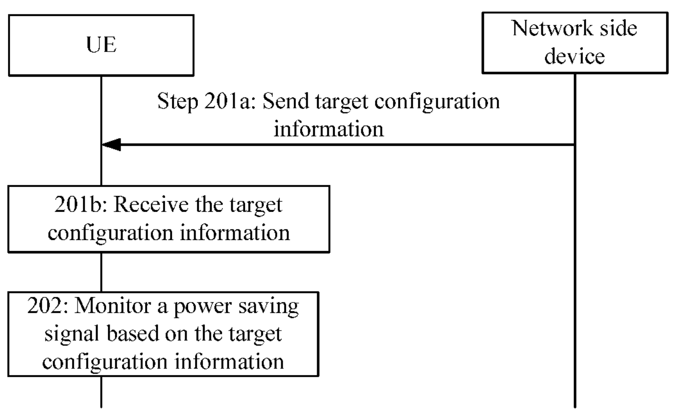
FIG. 6 is a second schematic diagram of a paging monitoring method according to an embodiment of this application.

Optionally, in an embodiment of this application, with reference to FIG. 2, as shown in FIG. 6, step 201 may be implemented by using the following step 201*a* and step 201*b*.

Step 201*a*: The network side device sends the target configuration information to the UE.

In this embodiment of this application, the target configuration information is used by the UE for monitoring the power saving signal.

Step 201*b*: The UE receives the target configuration information sent by the network side device.

Optionally, in this embodiment of this application, a cell in which the UE resides indicates supporting that one power saving signal is corresponding to a plurality of POs, and UEs in the plurality of POs corresponding to the power saving signal monitor the power saving signal, and determine, based on an indication of the power saving signal, whether to monitor the POs.

Optionally, in this embodiment of this application, the network side device supports that one power saving signal is corresponding to a plurality of POs.

A manner in which the cell in which the UE is located supports that one power saving signal is corresponding to a plurality of POs includes the following.

(1) Explicit indication: Information received by the UE from a network side carries indication information, and the indication information is used to indicate that the cell in which the UE is located supports that one power saving signal is corresponding to a plurality of POs. Optionally, the paging monitoring method provided in this embodiment of this application further includes the following step 301 and step 302.

Step 301: The network side device sends first indication information to the UE.

In this embodiment of this application, the first indication information is used to indicate that the network side device supports that one power saving signal is corresponding to a plurality of POs.

Step 302: The UE receives the first indication information sent by the network side device.

In one case, supporting that one power saving signal is corresponding to one PO and supporting that one power saving signal is corresponding to a plurality of POs are indicated separately, that is, two pieces of indication information are used to separately indicate that a current cell (namely, the cell in which the UE is located) supports that one power saving signal is corresponding to one PO and supports that one power saving signal is corresponding to a plurality of POs.

In the other case, one sign is used to indicate that the current cell supports the power saving signal, including supporting that one power saving signal is corresponding to one PO and supporting that one power saving signal is corresponding to a plurality of POs.

(2) Implicit indication: The configuration information of the power saving signal received by the UE includes a related parameter, for example, the number of POs corresponding to one power saving signal. The UE may determine, based on the related parameter, that the network side device supports one power saving signal corresponding to a plurality of POs.

Step 202: The UE monitors the power saving signal based on the target configuration information.

In this embodiment of this application, the UE may determine a group in which the UE is located, determine an offset of a PO relative to a reference PO based on a subgroup identifier, a mapping relationship between the power saving signal and the PO, and/or the first cycle, and determine a time domain location/frequency domain location of the power saving signal corresponding to the PO.

Optionally, in an implementation of this embodiment of this application, the target configuration information includes: the correspondence between the power saving signal and the PO, the first cycle, and target resource information. The target resource information includes time domain resource information of the power saving signal. Step 202 may be implemented by using the following step 202*a* to step 202*c*.

Step 202*a*: The UE determines a first correspondence based on the correspondence between the power saving signal and the PO.

In this embodiment of this application, the first correspondence is a correspondence between a power saving signal to be monitored by the UE and a PO to be monitored by the UE.

Step 202*b*: The UE determines a first time domain resource based on the first correspondence, the first cycle, and the time domain resource information of the power saving signal.

In this embodiment of this application, the first time domain resource is a time domain resource in which the power saving signal to be monitored by the UE is located.

Optionally, in this embodiment of this application, step 202*b* may be implemented by using the following step 202*b*1 and step 202*b*2.

Step 202*b*1: The UE determines a first offset based on the first correspondence and the first cycle.

In this embodiment of this application, the first offset is an offset, relative to the reference PO, of the PO to be monitored by the UE.

Optionally, in this embodiment of this application, the reference PO is a PO, whose distance from the power saving signal to be monitored by the UE is the smallest, of a plurality of consecutive POs controlled by the power saving signal to be monitored by the UE.

Optionally, in this embodiment of this application, step 202*b*1 may be implemented by using the following step 202*b*11 and step 202*b*12.

Step 202*b*11: The UE determines a PO overall index.

In this embodiment of this application, the UE may determine the PO overall index based on the first cycle.

In this embodiment of this application, the PO overall index is an index of the PO in the first cycle. In the first cycle, an index of a PO that first occurs is 0, and a value of an index increases incrementally.

Optionally, in this embodiment of this application, step 202*b*11 may be implemented by using the following step 202*b*111.

Step 202*b*111: The UE determines the PO overall index based on the start point of the first cycle and first information.

In this embodiment of this application, the first information includes at least one of the following: paging configuration information or a UE identifier. The paging configuration information is obtained by the UE from broadcast information.

In this embodiment of this application, a manner in which the UE determines the time domain resource location of the power saving signal is as follows: The UE may calculate an overall index (PO_overall_index) of a monitored PO. Optionally, the UE may calculate the overall index of the monitored PO based on the following information:

a paging frame PF monitored by the UE;

an index i_s of the PO in the paging frame;

a paging frame of a PO whose overall index is 0 in the first cycle and an index of the PO in the paging frame; and configuration information of paging carried in the system information, such as the number of all paging frames in the DRX cycle for the UE and the number of all POs in one PF.

Optionally, in this embodiment of this application, the UE may determine the PO overall index based on the start point of the first cycle and/or first information.

Step 202*b*12: The UE determines the first offset based on the PO overall index and the first correspondence.

Step 202*b*2: The UE determines the first time domain resource based on the first offset and the time domain resource information of the power saving signal.

Optionally, in this embodiment of this application, the time domain resource information of the power saving signal includes a time offset between the power saving signal and a reference PO.

Step 202*c*: The UE monitors the power saving signal in the first time domain resource.

In this embodiment of this application, the UE may determine, based on the calculated overall index, an offset, relative to the reference PO, of the PO monitored by the UE, to determine a time domain location of the reference PO. The UE determines the time domain location/frequency domain location of the power saving signal based on the target configuration information and the offset (namely, the first offset) of the PO relative to the reference PO. The configuration information of the power saving signal includes a time offset time-offset of the power saving signal from the reference PO.

The offset, relative to the reference PO, of the PO monitored by the UE is calculated in the following method: PO_PEI_index=((PO_overall_index) mod M). M is a correspondence between the power saving signal and the PO, that is, the number of POs controlled by the power saving signal corresponding to the UE. The offset of the PO monitored by the UE relative to the reference PO is an index of the UE in the plurality POs controlled by a corresponding power saving signal. The index of the reference PO is 0.

The UE determines the time domain location/frequency domain location of the power saving signal in the following method: g0=PO_0-time-offset, and PO_0 is a time domain location of the reference PO.

Optionally, in another implementation of this embodiment of this application, the foregoing target configuration information includes target resource information, and the target resource information includes the time domain resource information of the power saving signal. Step 202 may be implemented by using the following step 202*d* and step 202*e*.

Step 202*d*: The UE determines a second time domain resource based on the time domain resource information of the power saving signal.

In this embodiment of this application, the second time domain resource is a time domain resource in which a power saving signal whose distance from a PO to be monitored by the UE is the smallest is located.

Step 202*e*: The UE monitors the power saving signal in the second time domain resource.

In this embodiment of this application, the UE may determine the time domain resource location of the power saving signal based on the target configuration information, such as T_pei and PEI_offset. The UE determines the time domain resource location of the power saving signal in the following method. (SFN+PEI_offset) mod T_pei; and the UE can monitor a power saving signal whose distance from the PO monitored by the UE is the smallest.

The following describes, in an implementation, a process in which the UE monitors the power saving signal in a corresponding time domain resource.

In an implementation, mapping relationships between PEIs corresponding to different subgroups in a PO and the PO are different.

(1) The UE receives configuration information (namely, the target configuration information) of the power saving signal sent by the network side device and a subgroup identifier allocated by the network side device. The configuration information of the power saving signal includes a mapping relationship between the PEI and the PO.

(2) The UE determines, based on a subgroup in which the UE is located and the mapping relationship, between the PEI and the PO in the configuration information, in the configuration information of the power saving signal, a mapping relationship between the power saving signal corresponding to the UE and the PO. For example, if the UE is in a second subgroup, numPOs-persubgroup={1, 2, 2, 4}, the mapping relationship between the power saving signal corresponding to the UE and the PO is 1:2.

(3) The UE determines the time domain resource for the power saving signal based on the determined mapping relationship between the power saving signal and the PO and the time domain resource location of the PO monitored by the UE.

(4) The UE monitors the power saving signal in the time domain resource for the power saving signal.

In another implementation, it is assumed that a first PO starting from SFN=0 is used as the reference point and one SFN cycle is used as the first cycle. The UE determines a monitored PO and an offset of a power saving signal corresponding to the UE. The number M of POs corresponding to all power saving signals may be divisible by the number of all POs in 1024 radio frames, that is, it is ensured that a last PO in the 1024 radio frames is a last PO in a correspondence between all power saving signals and POs. Otherwise, it cannot be ensured that a first PO of a next SFN=0 is a first PO corresponding to the power saving signal.

Figure 7:
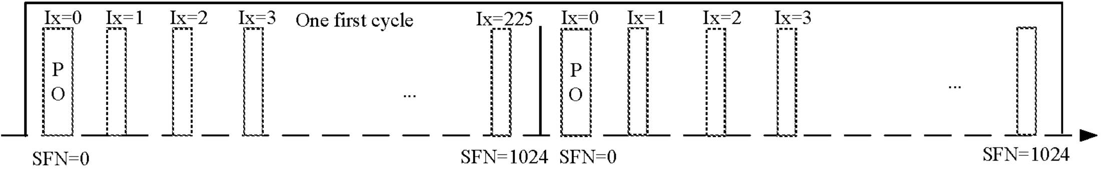
FIG. 7 is a fourth schematic diagram of an example of a correspondence between a power saving signal and a PO according to an embodiment of this application.

As shown in FIG. 7, it is assumed that N=T/8 and Ns=2, in one first cycle, namely, in 1024 radio frames, there are 1024/8*2=256 POs in total, and indexes of the POs are 0-255. Ix indicates PO_overall_index, namely, an index of one PO in one first cycle used as an observation cycle.

It is assumed that N=T/8, Ns=2, and the UE determines, by using the foregoing formula, a radio frame in which a paging frame for the UE is located and an index of a PO for the UE. It is assumed that a paging frame in which the UE needs to monitor paging at one time is SFN=449, i_s=1, and a correspondence between a power saving signal of a group in which the UE is located and the PO is 1:12. A numerical order of the PO corresponding to the power saving signal for the UE is determined in the following method.

(1) The overall index of the monitored PO is calculated.

PO_overall_index=floor ((PF−SFN_ref)*N/T)*Ns+i_s, where T is a DRX cycle of the UE, N is the number of total paging frames in T (number of total paging frames in T), Ns is the number of POs for a PF (number of paging occasions for a PF), i_s is an index of the PO, and SFN_ref is a start point of a reference time period.

$$\text{PO\_overall\_index} = \text{floor}((PF - \text{SFN\_ref}) * N/T) * Ns + \text{i\_s} = \text{floor}(449/8) * 2 + 1 = 113.$$

Figure 8:
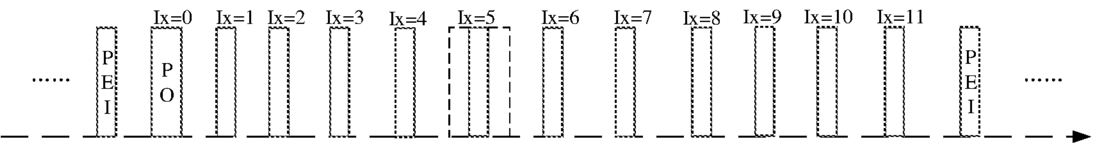
FIG. 8 is a fifth schematic diagram of an example of a correspondence between a power saving signal and a PO according to an embodiment of this application.

(2) An offset, relative to the reference PO, of the PO monitored by the UE is calculated by using the calculated index, to determine a time domain location of the reference PO. The offset, relative to the reference PO, of the PO monitored by the UE is calculated in the following method: PO_PEI_index=((PO_overall_index+1) mod M)−1=114 mod 12−1=5. It may be determined that the PO is a sixth PO corresponding to the power saving signal corresponding to the PO. As shown in FIG. 8, a location, relative to the power saving signal, of the PO monitored by the UE is a PO whose index is 5. Ix in FIG. 8 is PO_PEI_index, which is an index number of all POs corresponding to one PEI.

The UE determines, by using a time offset of the PEI from a first PO included in configuration information of the power saving signal and a location, relative to the reference PO, of the PO monitored by the UE, a time offset, relative to the PO monitored by the UE, of the power saving signal, to determine a time domain location of the power saving signal. The UE monitors the power saving signal at a determined resource location of the power saving signal.

An embodiment of this application provides a paging monitoring method. The UE may monitor a power saving signal based on target configuration information. The target configuration information includes at least one of the following: a correspondence between the power saving signal and a PO, a first cycle, or target resource information. In this solution, when monitoring the power saving signal, the UE may flexibly monitor the power saving signal based on related configuration information, namely, a flexibly configured correspondence between the power saving signal and a PO (that is, a correspondence that is between the power saving signal and a PO and that is flexibly configured for UEs in different groups), the first cycle, and/or the target resource information, to reduce a load of the power saving signal and ensure detection performance of a PEI, so that power saving effects of UEs in a cell are relatively equal.

Optionally, in this embodiment of this application, the target configuration information includes at least one of the following: the correspondence between the power saving signal and the paging occasion PO or the first cycle. The paging monitoring method provided in this embodiment of this application further includes the following step 401.

Step 401: In a case that PO change is supported, the UE monitors the PO based on the target configuration information.

In this embodiment of this application, in a case that the UE and/or a network side device supports the PO change, the UE may monitor the PO based on the target configuration information (namely, the correspondence between the power saving signal and the paging occasion PO and/or the first cycle).

Optionally, in this embodiment of this application, step 401 may be implemented by performing the following step 401*a*.

Step 401*a*: In a case that the PO change is supported, the UE monitors the PO based on the target configuration information and a first movement cycle.

Optionally, in this embodiment of this application, the first movement cycle may be predefined, specified in a protocol, pre-configured, or configured by the network side device.

Optionally, in this embodiment of this application, the first movement cycle is configured in any one of the following manner:

A maximum DRX cycle for all UEs in a cell in which the UE is located is used as an interval; and a multiple of the maximum DRX cycle for all UEs in a cell in which the UE is located is used as an interval.

Optionally, in this embodiment of this application, the first movement cycle may alternatively be configured in another manner, and a unit of the first movement cycle may be a wireless frame or the like. If the first movement cycle (T_move_cycle) is not set, a default first movement cycle is determined as a cycle in which the UE monitors paging.

In this embodiment of this application, the UE may determine, based on configuration information (namely, the correspondence between the power saving signal and the paging occasion PO and/or the first cycle) of the power saving signal, that the power saving signal is corresponding to at most M POs, or a correspondence between the power saving signal corresponding to the UE and the PO is 1:M, to implement PO monitoring.

Optionally, in this embodiment of this application, step 401 may be implemented by using the following step 401*b* and step 401*c*.

Step 401*b*: In a case that the PO change is supported, the UE determines a target time domain location based on the target configuration information and according to a target movement rule.

In this embodiment of this application, the target time domain location is a time domain location of a PO to be monitored by the UE, and the target movement rule is a movement rule for the PO.

Optionally, in this embodiment of this application, step 401*b* may be implemented by using the following step 401*b*1 and step 401*b*2.

Step 401*b*1: In a case that the PO change is supported, the UE determines first information based on the target configuration information and according to a target movement rule.

Step 401*b*2: The UE determines the target time domain location based on the first information.

In this embodiment of this application, the first information is any one of the following: a reference offset, a PO, before change, monitored by the UE, and a second offset. The reference offset is a first offset, in a reference movement cycle, of the PO to be monitored by the UE, the reference movement cycle is a movement cycle with a start point of the first cycle as a start point, and the second offset is a first offset of a PO currently and actually monitored by the UE.

Optionally, in this embodiment of this application, the PO, before change, monitored by the UE may be determined by a UE identifier and paging configuration information.

Optionally, in this embodiment of this application, a first offset is calculated in a first T_move_cycle, namely, a reference movement cycle. The UE may calculate, based on the UE identifier (namely, UE_ID), an overall index that is of indexes of a PO to be monitored, which is denoted as PO-0. An offset of PO-0 relative to the reference PO is denoted as PO-offset-0, the first T_move_cycle uses the start point of the first cycle as a start point, and a length is T_move_cycle. A calculation method includes:

PO-0=floor(Pf_0/N*T)*Ns+i_s; PO-offset-0=PO-0 mod M. T is a DRX cycle of the UE; N is the number of total paging frames in T (number of total paging frames in T); and Ns is the number of POs for a PF (number of paging occasions for a PF).

In a current T_move_cycle, the UE may determine a second offset PO-offset (0<=PO-offset<=M−1), relative to the reference PO, of the PO to be monitored by the current UE. First, an index of the current T_move_cycle is determined, that is, a numerical order of the current T_move_cycle movement cycle in the following method: Num_T_move=floor (PF_current/T_move_cycle) mod max_n_move. max_n_move is the number of T_move_cycle in one SFN cycle. Then PO-offset is determined in the following method: PO-offset=(PO-offset-0+(Num_T_move mod M)) mod M.

The UE determines a PO actually monitored by the UE in the following method: The UE calculates, based on the UE_ID, a PO to be currently monitored by the UE, which is denoted as PO-legacy; and the PO actually monitored by the UE is PO-curr=PO-legacy+(PO-offset-PO-offset-0).

In one case, if PO-offset-PO-offset-0>0, "+(PO-offset-PO-offset-0)" indicates that the UE is offset by (PO-offset-PO-offset-0) POs toward right.

In the other case, if PO-offset-PO-offset-0<0, "−(PO-offset-0-PO-offset)" indicates that the UE is offset by (PO-offset-0-PO-offset) POs toward the left.

The UE monitors the power saving signal. If the power saving signal indicates that paging needs to be monitored, the UE monitors paging in a PO_curr corresponding to a determined current T_move.

Step 401*c*: The UE monitors the PO at the target time domain location.

The following describes, in an implementation, a process in which the UE monitors the PO in a case that the PO change is supported.

This solution is applicable to a case in which all DRX cycles may be divisible by all M, where M is the number of POs corresponding to the power saving signal.

Figure 9:
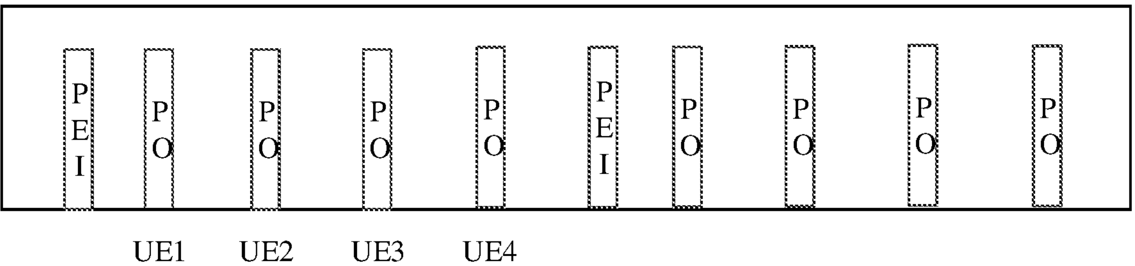
FIG. 9 is a sixth schematic diagram of an example of a correspondence between a power saving signal and a PO according to an embodiment of this application.

When one power saving signal is corresponding to a plurality of POs, an interval between the UE in a first PO corresponding to the power saving signal and the power saving signal is small. Therefore, the UE does not need to wake up in advance for an excessively long time to monitor the power saving signal. However, an interval between the UE in a last PO corresponding to the power saving signal and the power saving signal is large. Therefore, the UE needs to wake up in advance for an excessively long time to monitor the power saving signal. Therefore, gains obtained by enjoying the power saving signal by different UEs are unequal. When the number of POs corresponding to the power saving signal increases, inequality becomes increasingly severe. FIG. 9 shows relationships between different UEs (for example, UE1 to UE4) and PEIs. One PEI is corresponding to four POs, and a power saving effect of UE4 is not as good as a power saving effect of UE1.

For example, as shown in Table 1, it is assumed that an offset of a PO in a smallest PF for the UE relative to a first PO is 2, and M is 4. PO-legacy is a PO calculated based on UE_ID and paging configuration information.

TABLE 1

| Index of T_move | Offset, relative to a reference PO, of a PO monitored by the UE | PO actually monitored by the UE |
|---|---|---|
| 0 | 2 | PO-legacy |
| 1 | 3 | PO-legacy + 1 |
| 2 | 0 | PO-legacy − 2 |
| 3 | 1 | PO-legacy − 1 |
| 4 | 2 | PO-legacy + 1 |

Solution 1: in a PO change solution provided in an embodiment of this application, a common T_move_cycle is set. M means the number of the most POs controlled by the power saving signal, so that all UEs can equally enjoy an energy-saving gain brought by the power saving signal.

Figure 10:
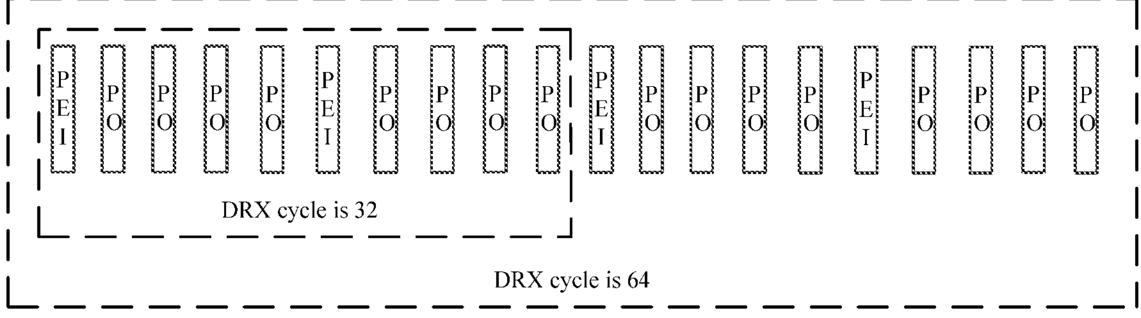
FIG. 10 is a seventh schematic diagram of an example of a correspondence between a power saving signal and a PO according to an embodiment of this application.

It is assumed that N=T/8, Ns=2, one PEI is corresponding to four POs. It is assumed that a largest DRX cycle of all UEs in a current cell is 64, that is, a DRX cycle for a UE in the current cell is 32, and a DRX cycle for a UE in the current cell is 64. As shown in FIG. 10, when the DRX cycle is 32, for all UEs whose DRX cycle are 32, there are 8 POs in one DRX cycle. When the DRX cycle is 64, for all UEs whose DRX cycle are 64, there are 16 POs in one DRX cycle.

Figure 11:
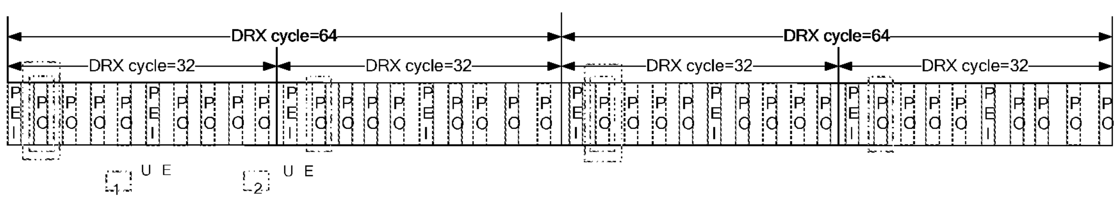
FIG. 11 is an eighth schematic diagram of an example of a correspondence between a power saving signal and a PO according to an embodiment of this application.

It is assumed that the DRX cycle=32 used for UE1 to monitor paging, and DRX cycle=64 used for UE2 to monitor paging, distribution of POs for UE1 and UE2 is shown in FIG. 11. POs marked by the two dotted frames in different forms indicate POs for different UEs, that is, indicate a PO of UE1 and a PO of UE2 respectively.

Figure 12:
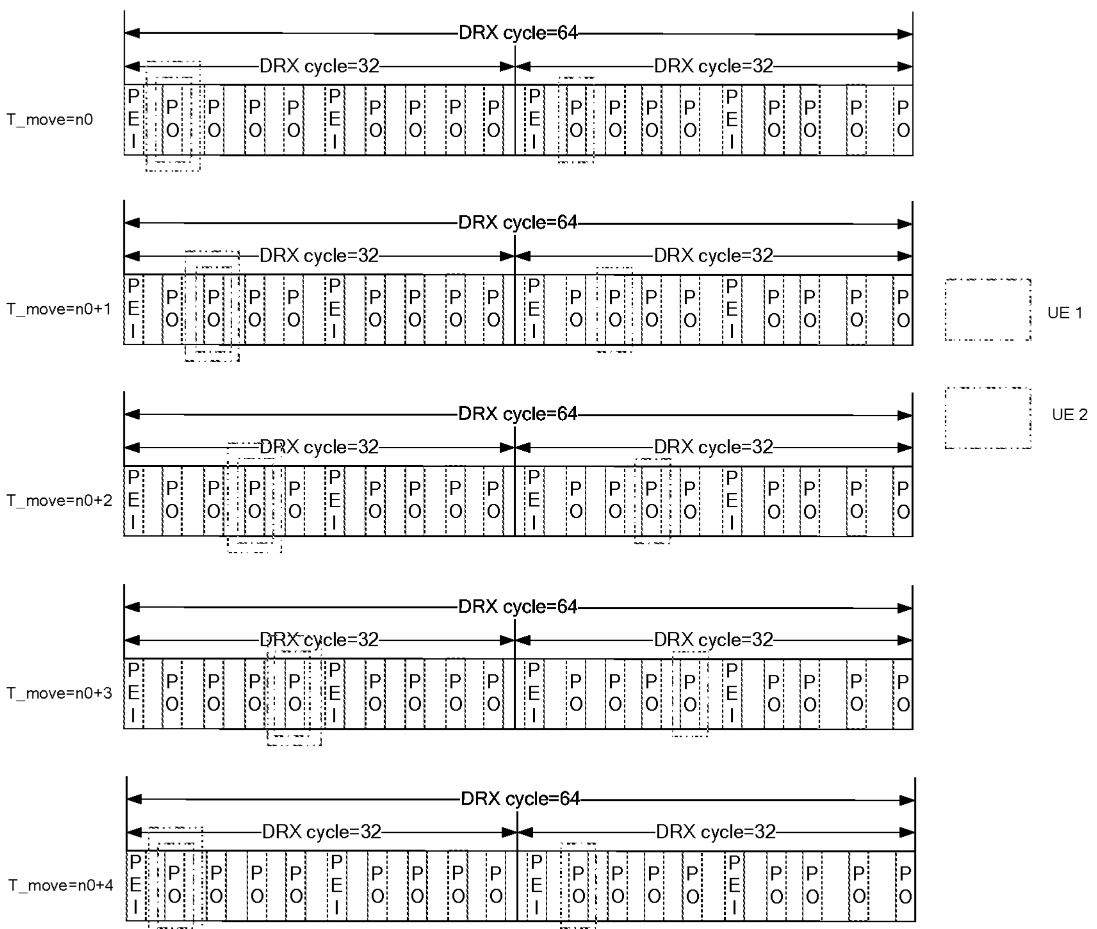
FIG. 12 is a ninth schematic diagram of an example of a correspondence between a power saving signal and a PO according to an embodiment of this application.

If it is specified that T_move=64, and for all UEs, proportions of power saving signals to POs are respectively the same, namely, 1:4, and the UEs are UEs that support a one-to-many relationship between the power saving signals and the POs. The PO is monitored according to the foregoing movement rule, and movement manners for UE1 and UE2 are shown in FIG. 12. It can be learned from FIG. 12 that an interval between a PO in which the UE1 is located and a PEI constantly changes, so that power saving gains of all UEs are the same.

Figure 13:
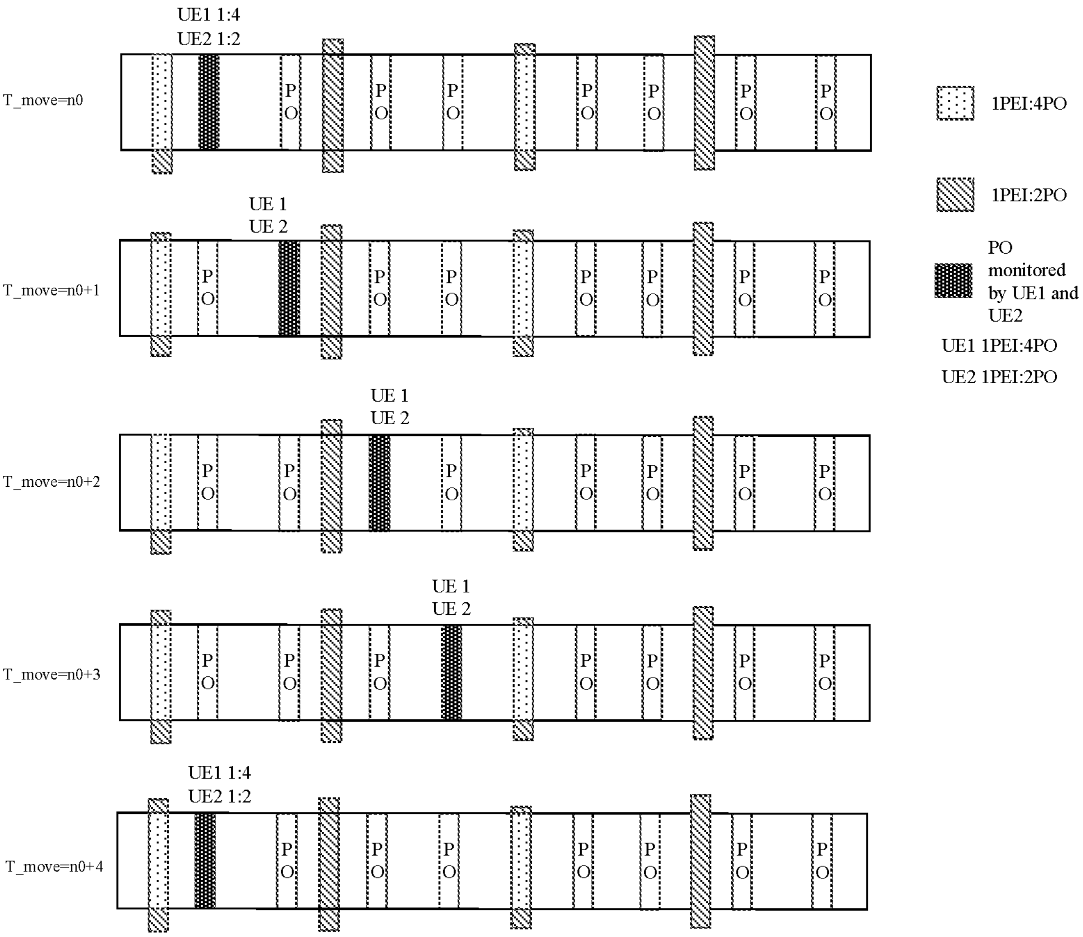
FIG. 13 is a tenth schematic diagram of an example of a correspondence between a power saving signal and a PO according to an embodiment of this application.

If DRX cycles of all UEs are 32, T_move=32 is specified. In addition, for each UE, there are two one-two-many proportions of a power saving signal to POs, which are respectively 1:4 and 1:2, and the UE is a UE that supports a one-to-many relationship between the power saving signal and the POs, the PO is monitored according to the foregoing movement rule. Movement manners for UE1 and UE2 are shown in FIG. 13. It can be learned from FIG. 13 that an interval between a PO in which UE1 is located and a PEI and an interval between a PO in which the UE2 is located and a PEI constantly change, so that power saving gains of all UEs are the same.

Solution 2: In a PO change solution provided in an embodiment of this application, a common T_move_cycle is not set, and M is the number of POs controlled by the power saving signal corresponding to the UE, so that all UEs can equally enjoy an energy saving gain brought by the power saving signal.

Figures 14, 15:
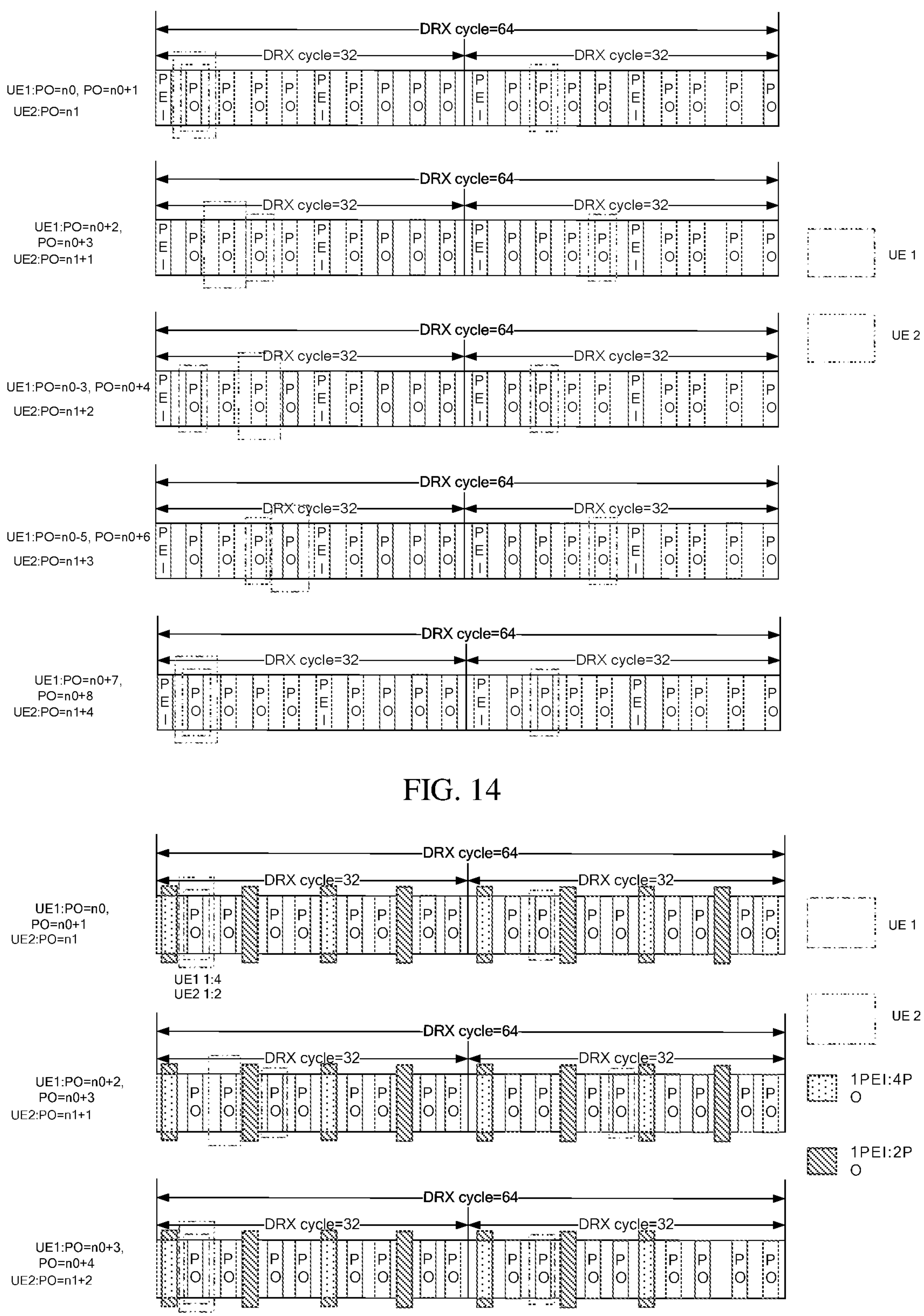
FIG. 14 is an eleventh schematic diagram of an example of a correspondence between a power saving signal and a PO according to an embodiment of this application.
FIG. 15 is a twelfth schematic diagram of an example of a correspondence between a power saving signal and a PO according to an embodiment of this application.

It is assumed that DRX cycle=32 used for UE1 to monitor paging; and DRX cycle=64 used for UE2 to monitor paging, and a proportion for UE1 and a proportion for UE2 are both 1:4, UE1 and UE2 respectively monitor a PO in a DRX cycle, and movement manners for UE1 and UE2 are shown in FIG. 14.

It is assumed that DRX cycle=32 used for UE1 to monitor paging; and DRX cycle=64 for UE2 to monitor paging, and power saving signal for UE1:PO=1:4, and power saving signal for UE2:PO=1:2, UE1 and UE2 respectively monitor a PO in a DRX cycle and a proportion between the power saving signal to a PO, and movement manners for UE1 and UE2 are shown in FIG. 15.

Solution 3: In the PO change solution provided in this embodiment of this application, a common T_move_cycle is set, and M is the number of POs controlled by the power saving signal corresponding to the UE, so that all UEs can equally enjoy an energy saving gain brought by the power saving signal.

Figure 16:
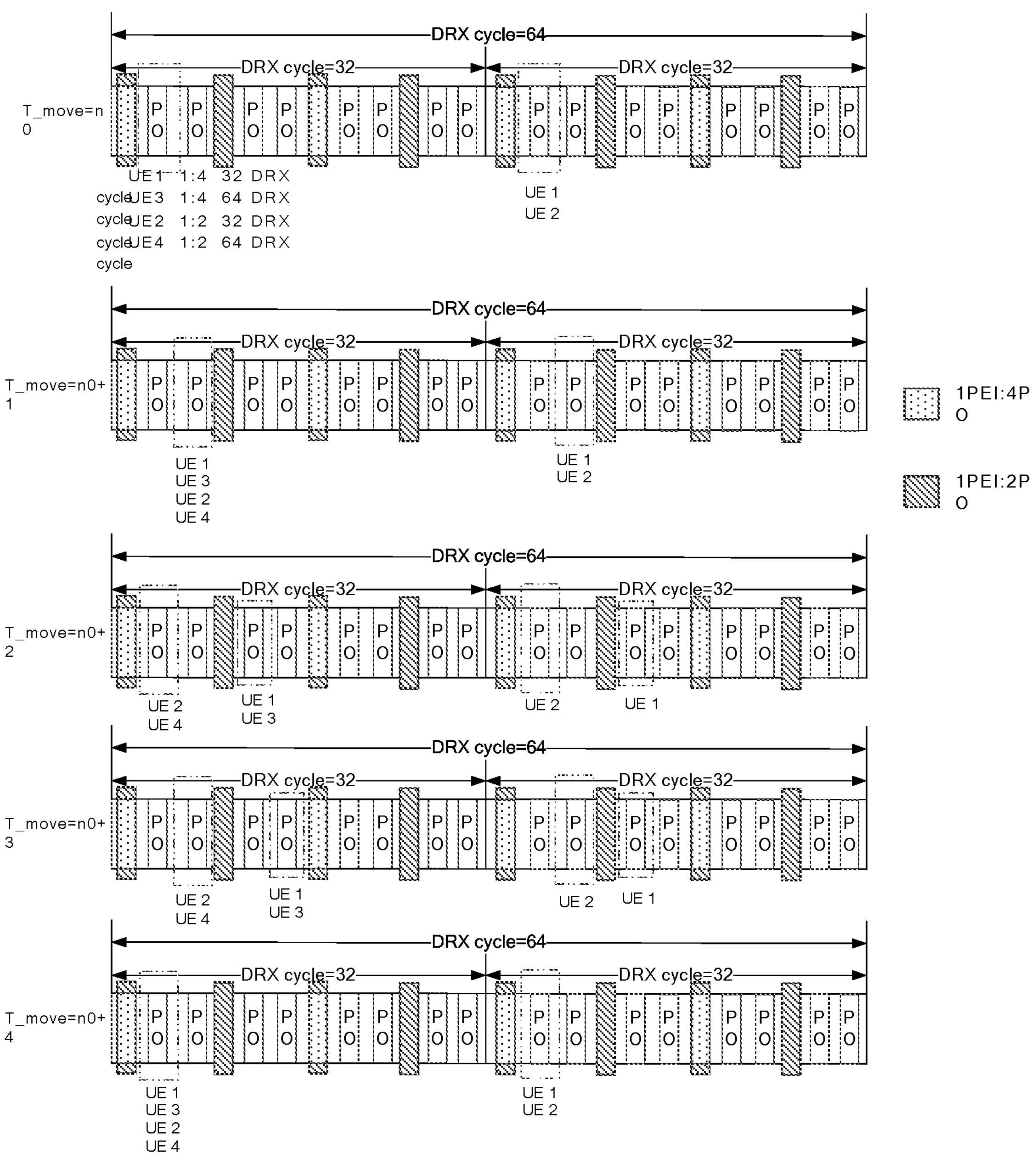
FIG. 16 is a thirteenth schematic diagram of an example of a correspondence between a power saving signal and a PO according to an embodiment of this application.

It is assumed that DRX cycle=32 used for UE1 and UE2 to monitor paging; DRX cycle=64 for UE3 and UE4 to monitor paging, and a mapping relationship between a PEI and a PO of UE1 or UE3 is 1:4; and a mapping relationship between a PEI and a PO of UE2 or UE4 is 1:2. Movement is performed according to the movement solution 3 (movement is performed in a time interval), and movement manners for UE1 and UE2 are shown in FIG. 16.

Solution 4: In a PO change solution provided in an embodiment of this application, a common T_move_cycle is not set, and M is the number of the most POs controlled by the power saving signal, so that all UEs can equally enjoy an energy saving gain brought by the power saving signal.

Figure 17:
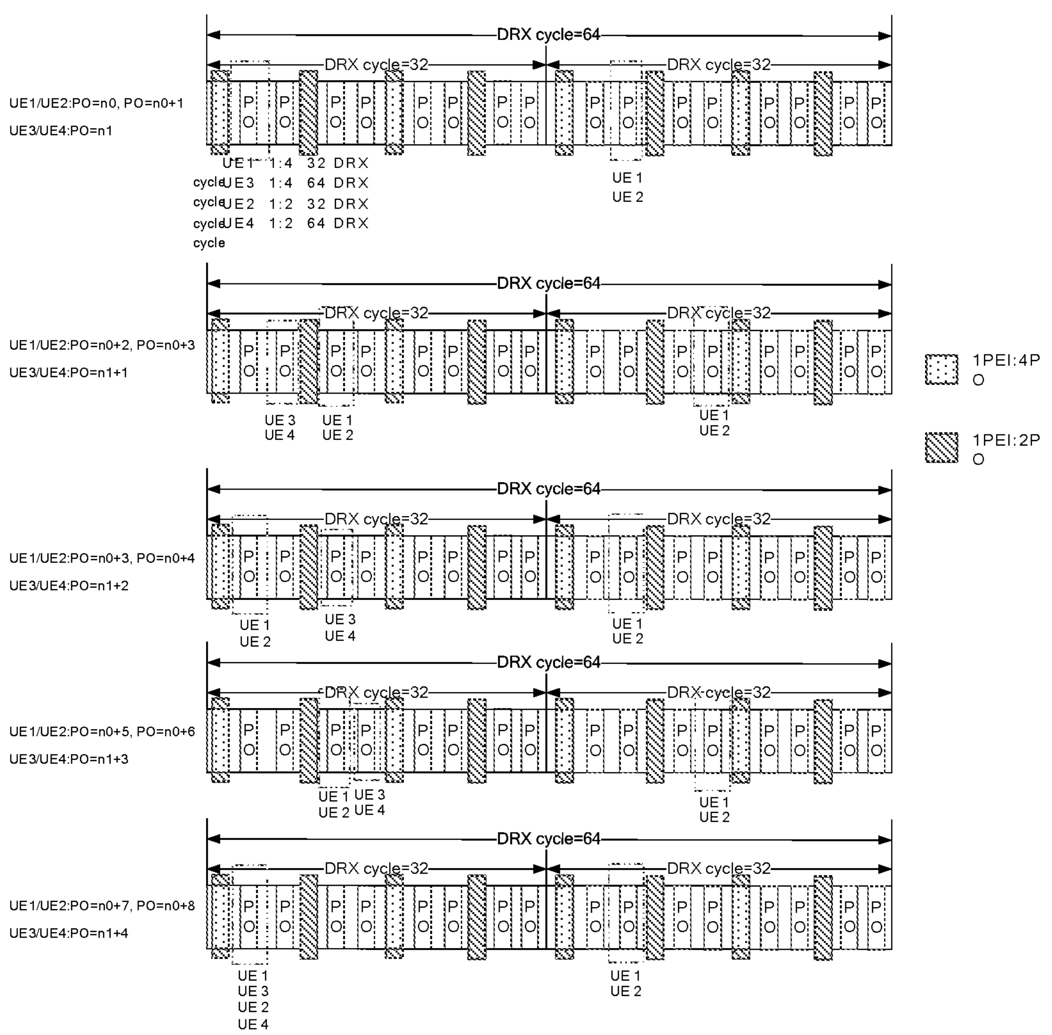
FIG. 17 is a fourteenth schematic diagram of an example of a correspondence between a power saving signal and a PO according to an embodiment of this application.

It is assumed that DRX cycle=32 used for UE1 and UE2 to monitor paging; and DRX cycle=64 used for UE3 and UE4 to monitor paging, and a mapping relationship between a PEI and a PO of UE1 or UE3 is 1:4; and a mapping relationship between a PEI and a PO of UE2 or UE4 is 1:2. Movement is performed according to the movement solution 4 (movement is performed based on a mapping relationship between a maximum PEI and a PO), and movement manners for UE1 and UE2 are shown in FIG. 17.

In an embodiment of this application, according to the movement solution in which the UE detects a PO, fairness of a power saving gain for all UEs is ensured, so that all UEs in a cell can equally enjoy the power saving gain.

In a case of the following behavior: that one power saving signal is corresponding to a plurality of POs is not supported but previously supported in a cell in which the UE resides, (1) the UE resides in a Cell1 on a first occasion, reads that system information of the Cell1 indicates that one power saving signal is corresponding to a plurality of POs, and receives configuration information of the power saving signal;

(2) the UE determines a time domain resource of the power saving signal based on the configuration information of the power saving signal and a PO monitored by the UE, and monitors the power saving signal in a corresponding resource;

(3) the UE reads the system information of the Cell1 on a second occasion and finds that in the second occasion, the Cell1 does not support that one power saving signal is corresponding to a plurality of POs, but in the second occasion, the Cell1 supports that one power saving signal is corresponding to one PO, or finds from the system information that the Cell1 does not support the power saving signal in the second occasion; and (a) if it is supported that one power saving signal is corresponding to one PO on the second occasion, the UE re-determines, based on configuration of the received power saving signal, a resource location of the power saving signal corresponding to the PO monitored by the UE; and monitors the power saving signal at a corresponding resource location; or (b) if the cell does not support the power saving signal on the second occasion, the UE does not monitor the power saving signal and monitors a PO in each DRX cycle.

It should be noted that the paging monitoring method provided in this embodiment of this application may be further performed by a paging monitoring apparatus or a control module that is in the UE (or a network side device) and that is configured to perform the paging monitoring method.

Figure 18:
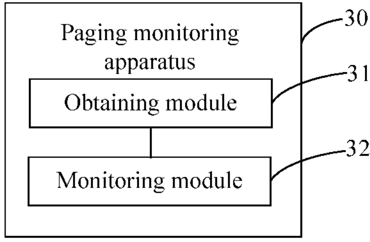
FIG. 18 is a first schematic structural diagram of a paging monitoring apparatus according to an embodiment of this application.

FIG. 18 is a possible schematic structural diagram of a paging monitoring apparatus according to an embodiment of this application. As shown in FIG. 18, the paging monitoring apparatus 30 may include: an obtaining module 31 and a monitoring module 32.

The obtaining module 31 is configured to obtain target configuration information. The target configuration information includes at least one of the following: a correspondence between a power saving signal and a PO, a first cycle, or target resource information. The target resource information is used to indicate a resource used for the power saving signal. The monitoring module 32 is configured to monitor the power saving signal based on the target configuration information obtained by the obtaining module 31.

In a possible implementation, the UE supports the power saving signal and supports that one power saving signal is corresponding to a plurality of POs. A correspondence between the power saving signal and the PO is that one power saving signal is corresponding to M POs, where M is an integer greater than or equal to 1.

In a possible implementation, that one power saving signal is corresponding to M POs includes at least one of the following: One power saving signal is corresponding to all subgroups in M POs, one power saving signal is corresponding to one subgroup in M POs, or one power saving signal is corresponding to N groups in M POs, where N is the number of subgroups corresponding to the power saving signal, and N is an integer greater than or equal to 1.

In a possible implementation, the first cycle is any one of the following: one SFN cycle and one preset time period; and/or the foregoing first cycle includes at least one of the following: a start point, an end point, or duration; and/or the target resource information includes at least one of the following: time domain resource information of the power saving signal or frequency domain resource information of the power saving signal.

In a possible implementation, the paging monitoring apparatus provided in this embodiment of this application further includes a sending module. The sending module is configured to receive first indication information sent by the network side device. The first indication information is used to indicate that the network side device supports that one power saving signal is corresponding to a plurality of POs.

In a possible implementation, the target configuration information includes: the correspondence between the power saving signal and the PO, the first cycle, and the target resource information. The target resource information includes time domain resource information of the power saving signal. The monitoring module 32 is configured to: determine a first correspondence based on the correspondence between the power saving signal and the PO, where the first correspondence is a correspondence between a power saving signal to be monitored by the UE and a PO to be monitored by the UE; determine a first time domain resource based on the first correspondence, the first cycle, and the time domain resource information of the power saving signal, where the first time domain resource is a time domain resource in which the power saving signal to be monitored by the UE is located; and monitor the power saving signal in the first time domain resource.

In a possible implementation, the monitoring module 32 is configured to: determine a first offset based on the first correspondence and the first cycle, where the first offset is an offset, relative to a reference PO, of the PO to be monitored by the UE; and determine the first time domain resource based on the first offset and the time domain resource information of the power saving signal.

In a possible implementation, the time domain resource information of the power saving signal includes a time offset between the power saving signal and the reference PO. The reference PO is a PO whose distance from the power saving signal to be monitored by the UE is the smallest among a plurality of consecutive POs controlled by the power saving signal to be monitored by the UE.

In a possible implementation, the monitoring module 32 is configured to: determine a PO overall index, where the PO overall index is an index of the PO in the first cycle; and determine the first offset based on the PO overall index and the first correspondence.

In a possible implementation, the monitoring module 32 is configured to determine the PO overall index based on the start point of the first cycle and first information. The first information includes at least one of the following: paging configuration information or a UE identifier. The paging configuration information is obtained by the UE from broadcast information.

In a possible implementation, the target configuration information includes target resource information, and the target resource information includes the time domain resource information of the power saving signal. The monitoring module 32 is configured to: determine a second time domain resource based on the time domain resource information of the power saving signal, where the second time domain resource is a time domain resource in which a power saving signal whose distance from a PO to be monitored by the UE is located; and monitor the power saving signal in the second time domain resource.

In a possible implementation, the target configuration information includes at least one of the following: the correspondence between the power saving signal and the paging occasion PO or the first cycle. The monitoring module 32 is further configured to monitor the PO based on the target configuration information in a case that PO change is supported.

In a possible implementation, the monitoring module 32 is configured to monitor the PO based on the target configuration information and a first movement cycle.

In a possible implementation, the first movement cycle is set in any one of the following:

A maximum DRX cycle for all UEs in a cell in which the UE is located is used as an interval; and a multiple of the maximum DRX cycle for all UEs in a cell in which the UE is located is used as an interval.

In a possible implementation, the monitoring module 32 is configured to: determine a target time domain location based on the target configuration information and according to a target movement rule, where the target time domain location is a time domain location of the PO to be monitored by the UE, and the target movement rule is a movement rule for the PO; and monitor the PO at the target time domain location.

In a possible implementation, the monitoring module 32 is configured to: determine the first information based on the target configuration information and according to the target movement rule; and determine the target time domain location based on the first information. The first information is any one of the following: a reference offset, a PO, before change, monitored by the UE, and a second offset. The reference offset is a first offset, in a reference movement cycle, of the PO to be monitored by the UE, the reference movement cycle is a movement cycle with a start point of the first cycle as a start point, and the second offset is a first offset of a PO currently and actually monitored by the UE.

An embodiment of this application provides a paging monitoring apparatus. When monitoring the power saving signal, the paging monitoring apparatus may flexibly monitor the power saving signal based on related configuration information, namely, a flexibly configured correspondence between the power saving signal and the PO (that is, a correspondence that is between the power saving signal and the PO and that is flexibly configured for UEs in different groups), the first cycle, and/or the target resource information, to reduce a load of the power saving signal and ensure detection performance of a PEI, so that power saving effects of UEs in a cell are relatively equal.

The paging monitoring apparatus in this embodiment of this application may be an apparatus, an apparatus or a UE that has an operating system, or may be a component, an integrated circuit, or a chip in the UE. The apparatus or the UE may be a mobile terminal or a non-mobile terminal. For example, the mobile terminal may include but is not limited to the foregoing listed type of the UE 11. The non-mobile terminal may be a server, a network attached storage (NAS), a personal computer (PC), a television (TV), a teller machine, or a self-service machine. This is not specifically limited in this embodiment of this application.

The paging monitoring apparatus provided in this embodiment of this application can implement the processes implemented by the UE in the foregoing method embodiment, and a same technical effect is achieved. To avoid repetition, details are not described herein again.

Figure 19:
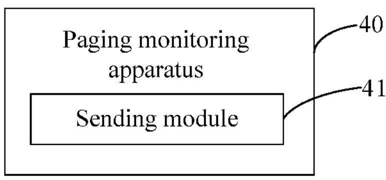
FIG. 19 is a second schematic structural diagram of a paging monitoring apparatus according to an embodiment of this application.

FIG. 19 is a possible schematic structural diagram of a paging monitoring apparatus according to an embodiment of this application. As shown in FIG. 19, the paging monitoring apparatus 40 may include a sending module 41.

The sending module 41 is configured to send target configuration information to a UE. The target configuration information is used for the UE to monitor a power saving signal. The target configuration information includes at least one of the following: a correspondence between a power saving signal and a PO, a first cycle, or target resource information. The target resource information is used to indicate a resource used for the power saving signal.

In a possible implementation, a network side device supports that one power saving signal is corresponding to a plurality of POs. The sending module 41 is further configured to send first indication information to the UE. The first indication information is used to indicate that the network side device supports that one power saving signal is corresponding to a plurality of POs.

An embodiment of this application provides a paging monitoring apparatus. When monitoring the power saving signal, the paging monitoring apparatus may flexibly monitor the power saving signal based on related configuration information, namely, a flexibly configured correspondence between the power saving signal and the PO (that is, a correspondence that is between the power saving signal and the PO and that is flexibly configured for UEs in different groups), the first cycle, and/or the target resource information, to reduce a load of the power saving signal and ensure detection performance of a PEI, so that power saving effects of UEs in a cell are relatively equal.

The paging monitoring apparatus in this embodiment of this application may be an apparatus, an apparatus or the network side device that has an operating system, or may be a component, an integrated circuit, or a chip in the network side device.

The paging monitoring apparatus provided in this embodiment of this application can implement the processes implemented by the network side device in the foregoing method embodiment, and a same technical effect is achieved. To avoid repetition, details are not described herein again.

Figure 20:
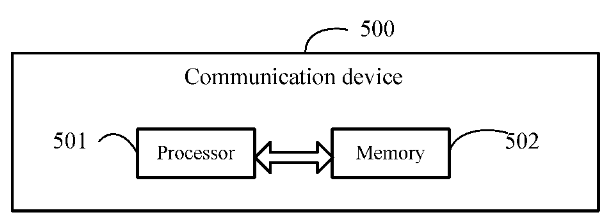
FIG. 20 is a schematic structural diagram of hardware of a communication device according to an embodiment of this application.

Optionally, as shown in FIG. 20, an embodiment of this application further provides a communication device 500, including a processor 501, a memory 502, and a program or instructions that are stored in the memory 502 and executable on the processor 501. For example, when the communication device 500 is a UE, the program or the instructions are executed by the processor 501 to implement processes implemented by the UE in the foregoing method embodiment, and a same technical effect can be achieved. In a case that the communication device 500 is a network side device, when the program or the instructions are executed by the processor 501, processes implemented by the network side device in the foregoing method embodiment are implemented, and a same technical effect can be achieved. To avoid repetition, details are not described herein again.

Figure 21:
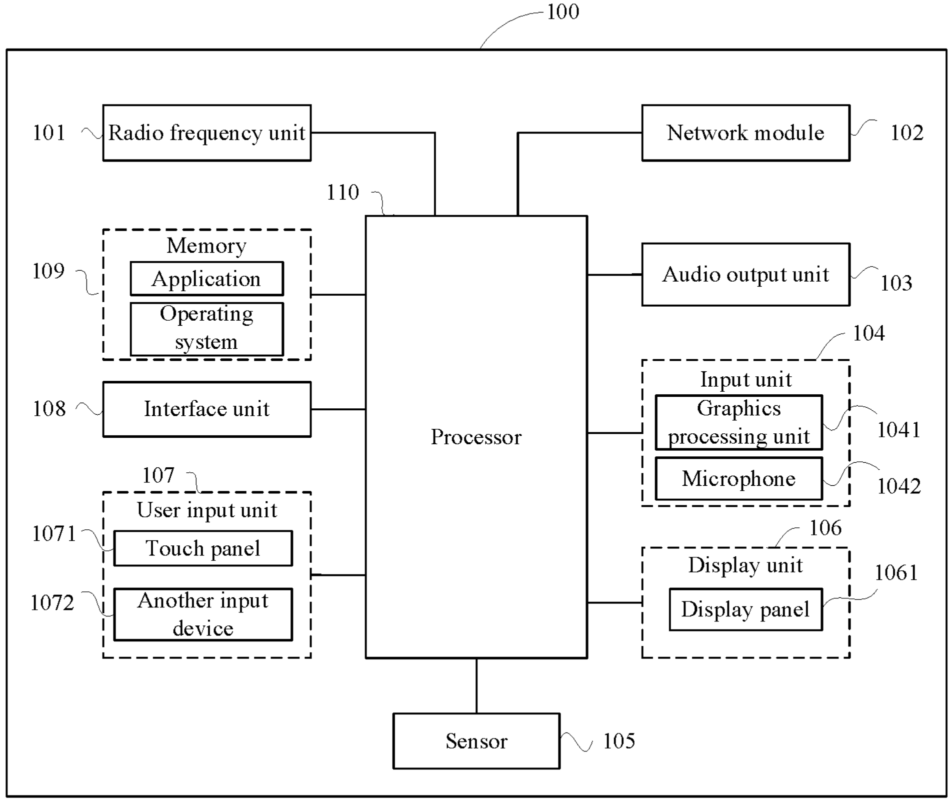
FIG. 21 is a schematic structural diagram of hardware of a UE according to an embodiment of this application.

An embodiment of this application further provides a UE, including a processor and a communication interface. The processor is configured to: obtain target configuration information, where the target configuration information includes at least one of the following: a correspondence between a power saving signal and a PO, a first cycle, or target resource information, and the target resource information is used to indicate a resource used for the power saving signal; and monitor the power saving signal based on the target configuration information. This embodiment of the UE corresponds to the method embodiment for the foregoing UE side. Each implementation process of and implementation manner for the foregoing method embodiment are both applicable to this embodiment of the UE, and a same technical effect can be achieved. Optionally, FIG. 21 is a schematic structural diagram of hardware of UE according to an embodiment of this application.

The UE 100 includes but is not limited to at least a part of components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the UE 100 may further include a power supply (such as a battery) that supplies power to each component. The power supply may be logically connected to the processor 110 by using a power supply management system, to implement functions such as charging and discharging management, and power consumption management by using the power supply management system. The structure of the UE shown in FIG. 21 constitutes no limitation on the UE, and the UE may include more or fewer components than those shown in the figure, combine some components, or have different component arrangements. Details are not described herein.

It should be understood that, in this embodiment of this application, the input unit 104 may include a graphics processing unit (GPU) 1041 and a microphone 1042, and the graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein.

In this embodiment of this application, the radio frequency unit 101 receives downlink data from a network side device and then sends the downlink data to the processor 110 for processing; and sends uplink data to the network side device. Usually, the radio frequency unit 101 includes but is not limited to an antenna, at least one amplifier, a transceiver, a coupler, a low noise amplifier, a duplexer, and the like.

The memory 109 may be configured to store a software program or instructions and various pieces of data. The memory 109 may mainly include a program or instruction storage area and a data storage area. The program or instruction storage area may store an operating system, and an application or instructions required by at least one function (for example, a sound playing function or an image playing function). In addition, the memory 109 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash storage device, or another non-volatile solid-state storage device.

The processor 110 may include one or more processing units. Optionally, an application processor and a modem processor may be integrated into the processor 110. The application processor mainly processes an operating system, a user interface, an application, instructions, or the like. The modem processor mainly processes wireless communication, for example, a baseband processor. It can be understood that, alternatively, the modem processor may not be integrated into the processor 110.

The processor 110 is configured to: obtain target configuration information, where the target configuration information includes at least one of the following: a correspondence between a power saving signal and a PO, a first cycle, or target resource information, and the target resource information is used to indicate a resource used for the power saving signal; and monitor the power saving signal based on the target configuration information.

An embodiment of this application provides a UE. When monitoring the power saving signal, the UE may flexibly monitor the power saving signal based on related configuration information, namely, a flexibly configured correspondence between the power saving signal and the PO (that is, a correspondence that is between the power saving signal and the PO and that is flexibly configured for UEs in different groups), the first cycle, and/or the target resource information, to reduce a load of the power saving signal and ensure detection performance of a PEI, so that power saving effects of UEs in a cell are relatively equal.

The processes implemented by the UE in the foregoing method embodiment can be implemented by using the UE provided in this embodiment of this application, and a same technical effect is achieved. To avoid repetition, details are not described herein again.

An embodiment of this application further provides a network side device, including a processor and a communication interface. The communication interface is configured to send target configuration information to a UE, and the target configuration information is used by the UE to monitor a power saving signal. The target configuration information includes at least one of the following: a correspondence between the power saving signal and a PO, a first cycle, or target resource information. The target resource information is used to indicate a resource used for the power saving signal. This embodiment of the network side device is corresponding to the method embodiment of the foregoing network side device. Each implementation process of and implementation manner for the foregoing method embodiment may be applicable to the embodiment of this network side device, and a same technical effect can be achieved.

Figure 22:
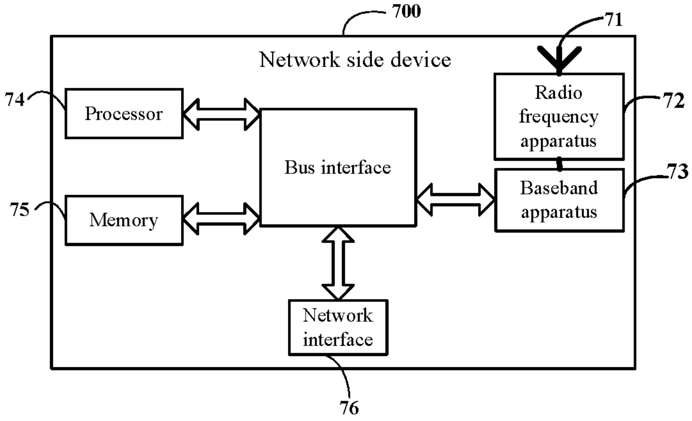
FIG. 22 is a schematic structural diagram of hardware of a network side device according to an embodiment of this application.

Optionally, an embodiment of this application further provides a network side device. As shown in FIG. 22, the network side device 700 includes: an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends processed information to the radio frequency apparatus 72. The radio frequency apparatus 72 processes the received information and then sends the processed information through the antenna 71.

The frequency band processing apparatus may be located in the baseband apparatus 73. The method performed by the network side device in the foregoing embodiment may be implemented in the baseband apparatus 73. The baseband apparatus 73 includes a processor 74 and a memory 75.

The baseband apparatus 73 may include, for example, at least one baseband board, where a plurality of chips are disposed on the baseband board. As shown in FIG. 22, one chip is, for example, the processor 74, which is connected to the memory 75, to invoke a program in the memory 75 to perform operations of the network side device shown in the foregoing method embodiment.

The baseband apparatus 73 may further include a network interface 76 for exchanging information with the radio frequency apparatus 72. The interface is, for example, a common public radio interface (CPRI).

The radio frequency apparatus 72 is configured to send target configuration information to a UE. The target configuration information is used for the UE to monitor a power saving signal. The target configuration information includes at least one of the following: a correspondence between the power saving signal and a PO, a first cycle, or target resource information. The target resource information is used to indicate a resource used for the power saving signal.

An embodiment of this application provides a network side device. The network side device may send the UE related configuration information of monitoring of the power saving signal, namely, a flexibly configured correspondence between the power saving signal and the PO (that is, a correspondence that is between the power saving signal and the PO and that is flexibly configured for UEs in different groups), a first cycle, and/or target resource information. Therefore, when monitoring the power saving signal, the UE may flexibly monitor the power saving signal based on the related configuration information, to reduce a load of the power saving signal, and ensure detection performance of a PET, so that power saving effects of UEs in a cell are relatively equal.

The processes implemented by the network side device in the foregoing method embodiment can be implemented by using the network side device provided in this embodiment of this application, and a same technical effect is achieved. To avoid repetition, details are not described herein again.

Optionally, the network side device in this embodiment of this application further includes instructions or a program that is stored in the memory 75 and executable on the processor 74. The processor 74 invokes the instructions or the program in the memory 75 to perform the method performed by the modules or units, and a same technical effect is achieved. To avoid repetition, details are not described herein.

An embodiment of this application further provides a non-transitory readable storage medium. The non-transitory readable storage medium stores a program or instructions. When the program or the instructions are executed by a processor, the processes of the embodiment of the paging monitoring method are implemented, and a same technical effect can be achieved. To avoid repetition, details are not provided herein again.

The processor is a processor in the UE in the foregoing embodiment. The non-transitory readable storage medium includes a non-transitory computer-readable storage medium, such as a computer read-only memory (ROM), a random access memory (RAM), a magnetic disk, or an optical disc.

An embodiment of this application also provides a chip. The chip includes a processor and a communication interface, and the communication interface is coupled to the processor. The processor is configured to run a program or instructions to implement the processes of the embodiment of the paging monitoring method, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in implementations of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such understanding, the technical solutions of this application essentially or the part contributing to the prior art may be implemented in a form of a computer software product. The computer software product is stored in a storage medium (such as an ROM/RAM, a hard disk, or an optical disc), and includes several instructions for instructing a terminal (which may be mobile phone, a computer, a server, an air conditioner, a network side device, or the like) to perform the methods described in the embodiments of this application.

The embodiments of this application are described above with reference to the accompanying drawings, but this application is not limited to the foregoing implementations, and the foregoing implementations are only illustrative and not restrictive. Under the enlightenment of this application, a person of ordinary skill in the art can make many forms without departing from the purpose of this application and the protection scope of the claims, all of which fall within the protection of this application.

What is claimed is:

1. A paging monitoring method, comprising:

obtaining, by a user equipment (UE), target configuration information, wherein the target configuration information comprises: a correspondence between a power saving signal and a paging occasion (PO), a first cycle, and target resource information, and the target resource information comprises the time domain resource information of the power saving signal; and monitoring, by the UE, the power saving signal based on the target configuration information; wherein the monitoring, by the UE, the power saving signal based on the target configuration information comprises:

determining, by the UE, a first correspondence based on the correspondence between the power saving signal and the PO, wherein the first correspondence is a correspondence between a power saving signal to be monitored by the UE and a PO to be monitored by the UE;

determining, by the UE, a first time domain resource based on the first correspondence, the first cycle, and the time domain resource information of the power saving signal, wherein the first time domain resource is a time domain resource in which the power saving signal to be monitored by the UE is located; and monitoring, by the UE, the power saving signal in the first time domain resource.

2. The method according to claim 1, wherein the UE supports the power saving signal and that one power saving signal is corresponding to a plurality of POs; and the correspondence between the power saving signal and the PO is that one power saving signal is corresponding to M POs, and M is an integer greater than or equal to 1.

3. The method according to claim 1, wherein that one power saving signal is corresponding to M POs comprises at least one of the following that: one power saving signal is corresponding to all subgroups in M POs, one power saving signal is corresponding to one subgroup in M POs, or one power saving signal is corresponding to N groups in M POs, wherein N is the number of subgroups corresponding to the power saving signal, and N is an integer greater than or equal to 1.

4. The method according to claim 1, wherein the first cycle is any one of the following: an SFN cycle and a preset time period;

and/or the first cycle comprises at least one of the following: a start point, an end point, or duration;

and/or the target resource information further comprises frequency domain resource information of the power saving signal.

5. The method according to claim 1, wherein the method further comprises:

receiving, by the UE, first indication information sent by a network side device, wherein the first indication information is used to indicate that the network side device supports that one power saving signal is corresponding to a plurality of POs.

6. The method according to claim 1, wherein the determining, by the UE, a first time domain resource based on the first correspondence, the first cycle, and the time domain resource information of the power saving signal comprises:

determining, by the UE, a first offset based on the first correspondence and the first cycle, wherein the first offset is an offset, relative to a reference PO, of the PO to be monitored by the UE; and determining, by the UE, the first time domain resource based on the first offset and the time domain resource information of the power saving signal.

7. The method according to claim 6, wherein the time domain resource information of the power saving signal comprises a time offset between the power saving signal and the reference PO; and the reference PO is a PO, whose distance from the power saving signal to be monitored by the UE is the smallest, of a plurality of consecutive POs controlled by the power saving signal to be monitored by the UE.

8. The method according to claim 6, wherein the determining, by the UE, a first offset based on the first correspondence and the first cycle comprises:

determining, by the UE, a PO overall index, wherein the PO overall index is an index of the PO to be monitored in the first cycle; and determining, by the UE, the first offset based on the PO overall index and the first correspondence;

wherein the determining, by the UE, a PO overall index comprises:

determining, by the UE, the PO overall index based on a start point of the first cycle and first information, wherein the first information comprises at least one of the following: paging configuration information and a UE identifier, or the paging configuration information is obtained by the UE from broadcast information.

9. The method according to claim 1, wherein the method further comprises:

in a case that PO change is supported, monitoring, by the UE, the PO based on the target configuration information.

10. The method according to claim 9, wherein the monitoring, by the UE, the PO based on the target configuration information comprises:

monitoring, by the UE, the PO based on the target configuration information and a first movement cycle;

wherein the first movement cycle is set in any one of the following manners:

a maximum discontinuous reception DRX cycle for all UEs in a cell in which the UE is located is used as an interval; and a multiple of a maximum DRX cycle for all UEs in a cell in which the UE is located is used as an interval.

11. The method according to claim 9, wherein the monitoring, by the UE, the PO based on the target configuration information comprises:

determining, by the UE, a target time domain location based on the target configuration information and according to a target movement rule, wherein the target time domain location is a time domain location of the PO to be monitored by the UE, and the target movement rule is a movement rule for the PO; and monitoring, by the UE, the PO at the target time domain location;

wherein the determining, by the UE, a target time domain location based on the target configuration information and according to a target movement rule comprises:

determining, by the UE, first information based on the target configuration information and according to the target movement rule; and determining, by the UE, the target time domain location based on the first information, wherein the first information is any one of the following: a reference offset, a PO, before change, monitored by the UE, and a second offset, the reference offset is a first offset, in a reference movement cycle, of the PO to be monitored by the UE, the reference movement cycle is a movement cycle with a start point of the first cycle as a start point, and the second offset is a first offset of a PO currently and actually monitored by the UE.

12. A user equipment (UE), comprising a processor, a memory, and a program or instructions that are stored in the memory and executable on the processor, wherein the program or the instructions, when executed by the processor, causes the UE to perform:

obtaining target configuration information, wherein the target configuration information comprises: a correspondence between a power saving signal and a paging occasion (PO), a first cycle, and target resource information, and the target resource information comprises the time domain resource information of the power saving signal; and monitoring the power saving signal based on the target configuration information; wherein the program or the instructions, when executed by the processor, causes the UE to perform:

determining a first correspondence based on the correspondence between the power saving signal and the PO, wherein the first correspondence is a correspondence between a power saving signal to be monitored by the UE and a PO to be monitored by the UE;

determining a first time domain resource based on the first correspondence, the first cycle, and the time domain resource information of the power saving signal, wherein the first time domain resource is a time domain resource in which the power saving signal to be monitored by the UE is located; and monitoring the power saving signal in the first time domain resource.

13. The UE according to claim 12, wherein the UE supports the power saving signal and that one power saving signal is corresponding to a plurality of POs; and the correspondence between the power saving signal and the PO is that one power saving signal is corresponding to M POs, and M is an integer greater than or equal to 1.

14. The UE according to claim 13, wherein that one power saving signal is corresponding to M POs comprises at least one of the following that: one power saving signal is corresponding to all subgroups in M POs, one power saving signal is corresponding to one subgroup in M POs, or one power saving signal is corresponding to N groups in M POs, wherein N is the number of subgroups corresponding to the power saving signal, and N is an integer greater than or equal to 1.

15. The UE according to claim 12, wherein the first cycle is any one of the following: an SFN cycle and a preset time period;

and/or the first cycle comprises at least one of the following: a start point, an end point, or duration;

and/or the target resource information further comprises frequency domain resource information of the power saving signal.

16. The UE according to claim 12, the program or the instructions, when executed by the processor, causes the UE to further perform:

receiving first indication information sent by a network side device, wherein the first indication information is used to indicate that the network side device supports that one power saving signal is corresponding to a plurality of POs.

17. The UE according to claim 12, wherein the program or the instructions, when executed by the processor, causes the UE to perform:

determining a first offset based on the first correspondence and the first cycle, wherein the first offset is an offset, relative to a reference PO, of the PO to be monitored by the UE; and determining the first time domain resource based on the first offset and the time domain resource information of the power saving signal.

18. The UE according to claim 17, wherein the time domain resource information of the power saving signal comprises a time offset between the power saving signal and the reference PO; and the reference PO is a PO, whose distance from the power saving signal to be monitored by the UE is the smallest, of a plurality of consecutive POs controlled by the power saving signal to be monitored by the UE.

19. The UE according to claim 12, wherein the program or the instructions, when executed by the processor, causes the UE to perform:

determining a PO overall index, wherein the PO overall index is an index of the PO to be monitored in the first cycle; and determining the first offset based on the PO overall index and the first correspondence;

wherein the determining a PO overall index comprises:

determining the PO overall index based on a start point of the first cycle and first information, wherein the first information comprises at least one of the following: paging configuration information and a UE identifier, or the paging configuration information is obtained by the UE from broadcast information.

20. The UE according to claim 12, wherein the program or the instructions, when executed by the processor, causes the UE to further perform:

in a case that PO change is supported, monitoring the PO based on the target configuration information.

* * * * *